US009470305B2

(12) United States Patent
Kaskawitz et al.

(10) Patent No.: US 9,470,305 B2
(45) Date of Patent: Oct. 18, 2016

(54) VARIABLE SPEED CONTROL SYSTEMS AND METHODS FOR WALK-BEHIND WORKING MACHINES

(71) Applicant: Honda Motor Co., Ltd., Tokyo (JP)

(72) Inventors: Scott Kaskawitz, Hillsborough, NC (US); Vincent Andrew Prinzo, Hillsbourgh, NC (US); Brian Bender, Mebane, NC (US)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 14/163,798

(22) Filed: Jan. 24, 2014

(65) Prior Publication Data

US 2015/0211627 A1    Jul. 30, 2015

(51) Int. Cl.
*A01D 34/47* (2006.01)
*F16H 59/02* (2006.01)
*A01D 34/68* (2006.01)

(52) U.S. Cl.
CPC ......... *F16H 59/0278* (2013.01); *A01D 34/475* (2013.01); *A01D 34/6806* (2013.01); *Y10T 74/2014* (2015.01)

(58) Field of Classification Search
CPC .............................................. A01D 2034/6843
USPC ....... 180/19.1, 19.3; 74/501.6; 56/10.1, 11.1
See application file for complete search history.

(56) References Cited

U.S. PATENT DOCUMENTS 3,743,313 A     7/1973  Koch
3,841,069 A  *  10/1974 Weck ................... A01D 34/475
                                                 37/243
4,879,867 A  *  11/1989 Wenzel ................ A01D 34/69
                                                 56/11.1
4,930,369 A     6/1990  Barnard et al.
4,995,227 A     2/1991  Foster
5,085,043 A     2/1992  Hess et al.

(Continued)

FOREIGN PATENT DOCUMENTS

CA     2876870       7/2015
EP     0 923 686     6/1999

(Continued)

OTHER PUBLICATIONS

Notice of Allowance for U.S. Appl. No. 14/081,875 dated Jul. 15, 2015.

(Continued)

*Primary Examiner* — William C Joyce
*Assistant Examiner* — Randell J Krug
(74) *Attorney, Agent, or Firm* — Jenkins, Wilson, Taylor & Hunt, P.A.

(57) ABSTRACT

Variable speed control systems and methods for walk-behind working machines, such as lawnmowers and similar powered machines, can include a control lever with a lever arm that is selectively pivotable with respect to a machine handle between a first angular position at which a grip portion of the control lever is spaced apart from the handle by a first angle and a second angular position at which the control lever is proximate to the handle to control the working machine to be in one of a range of operating states corresponding to the angular position of the control lever. A control lever adjustment system is configured to selectively adjust the first angle to adjust a total possible angular travel of the control lever between the first angular position and the second angular position. In this way, an operator can set a range of operating states of the working machine.

18 Claims, 7 Drawing Sheets

(56) References Cited

U.S. PATENT DOCUMENTS

| | | | |
|---|---|---|---|
| 5,335,487 A * | 8/1994 | Murakawa | B60K 26/04 56/10.5 |
| 5,355,662 A * | 10/1994 | Schmidt | A01D 34/6812 180/19.3 |
| 5,375,674 A | 12/1994 | Peter | |
| 5,513,543 A | 5/1996 | Carlson | |
| 5,601,512 A | 2/1997 | Scag | |
| 5,701,967 A | 12/1997 | Barnard | |
| 5,735,064 A | 4/1998 | Holl | |
| 5,784,868 A | 7/1998 | Wadzinski | |
| 5,803,847 A * | 9/1998 | Kamm | A01D 34/69 474/37 |
| 5,842,552 A * | 12/1998 | Colber, Jr. | A01D 34/6806 192/111.12 |
| 6,070,690 A | 6/2000 | Eavenson | |
| 6,082,083 A * | 7/2000 | Stalpes | A01D 34/6806 56/10.8 |
| 6,098,492 A | 8/2000 | Juchniewicz | |
| 6,161,637 A | 12/2000 | Decker | |
| RE37,728 E | 6/2002 | Kamm | |
| 6,557,331 B2 | 5/2003 | Busboom | |
| 6,640,526 B2 | 11/2003 | Velke et al. | |
| 6,644,002 B2 | 11/2003 | Trefz | |
| 6,668,529 B2 | 12/2003 | Busboom | |
| 6,796,392 B2 * | 9/2004 | Kobayashi | B62D 51/04 180/19.3 |
| 6,951,092 B2 | 10/2005 | Busboom | |
| 7,032,333 B2 | 4/2006 | Friberg et al. | |
| 7,178,322 B2 * | 2/2007 | Osborne | A01D 34/824 56/10.8 |
| 7,194,827 B2 | 3/2007 | Mercer et al. | |
| 7,204,350 B2 * | 4/2007 | Lumpkin | B62L 3/023 188/24.14 |
| 7,263,818 B2 | 9/2007 | Osborne | |
| 7,293,397 B2 | 11/2007 | Osborne | |
| 7,318,309 B2 | 1/2008 | Osborne | |
| 7,520,112 B2 | 4/2009 | Osborne | |
| 7,521,615 B1 * | 4/2009 | Ho | G10D 3/14 84/304 |
| 7,523,600 B2 | 4/2009 | Sasaoka | |
| 7,540,131 B2 * | 6/2009 | Stover | A01D 34/824 180/19.3 |
| 7,543,429 B2 | 6/2009 | Kaskawitz | |
| 7,591,126 B2 | 9/2009 | Cox | |
| 7,624,521 B2 | 12/2009 | White et al. | |
| 7,644,781 B2 | 1/2010 | Moriyama | |
| 7,647,754 B2 | 1/2010 | Velke et al. | |
| 7,762,049 B2 | 7/2010 | Eaton | |
| 7,762,050 B1 * | 7/2010 | Kaskawitz | A01D 34/6806 180/19.3 |
| 7,850,555 B2 | 12/2010 | Keane | |
| 8,291,991 B1 * | 10/2012 | Cook | A01B 45/02 172/118 |
| 8,312,946 B2 | 11/2012 | Lahey | |
| 8,572,940 B2 * | 11/2013 | Schmidt | A01D 34/47 56/11.1 |
| 8,733,477 B1 * | 5/2014 | Cook | A01D 34/824 172/42 |
| 8,925,293 B2 * | 1/2015 | Mikula | G05G 1/04 56/16.7 |
| 2001/0000175 A1 * | 4/2001 | Kurane | C12Q 1/6816 514/44 R |
| 2002/0019277 A1 | 2/2002 | Kaesgen | |
| 2002/0083626 A1 * | 7/2002 | Pitts | E01H 5/12 37/196 |
| 2003/0000190 A1 | 1/2003 | Busboom | |
| 2003/0000192 A1 | 1/2003 | Busboom | |
| 2003/0056481 A1 * | 3/2003 | Trefz | A01D 34/6806 56/11.1 |
| 2003/0192295 A1 | 10/2003 | Busboom | |
| 2004/0050028 A1 * | 3/2004 | Ross | A01D 34/824 56/17.5 |
| 2005/0144919 A1 * | 7/2005 | Osborne | A01D 34/6806 56/10.8 |
| 2005/0252185 A1 * | 11/2005 | Osborne | A01D 34/6806 56/10.8 |
| 2005/0279066 A1 * | 12/2005 | Osborne | A01D 34/824 56/10.8 |
| 2006/0021313 A1 | 2/2006 | Keane | |
| 2006/0053763 A1 | 3/2006 | Stover | |
| 2006/0130808 A1 * | 6/2006 | Steffes | F02D 9/02 123/376 |
| 2006/0218887 A1 | 10/2006 | Osborne | |
| 2007/0114076 A1 | 5/2007 | Osborne | |
| 2007/0130899 A1 | 6/2007 | Osborne | |
| 2007/0271892 A1 | 11/2007 | Sasaoka | |
| 2007/0289785 A1 * | 12/2007 | Mayer | A01D 34/68 180/6.32 |
| 2008/0047246 A1 | 2/2008 | Osborne | |
| 2009/0107095 A1 * | 4/2009 | Kaskawitz | A01D 34/824 56/10.8 |
| 2011/0000175 A1 * | 1/2011 | Lahey | A01D 34/68 56/10.8 |
| 2011/0108335 A1 * | 5/2011 | Levander | A01D 34/824 180/19.3 |
| 2012/0000172 A1 * | 1/2012 | Papke | A01D 34/82 56/14.7 |
| 2012/0000173 A1 * | 1/2012 | Papke | A01D 34/82 56/14.7 |
| 2012/0216375 A1 | 8/2012 | Druhl | |
| 2013/0081500 A1 * | 4/2013 | Helin | A01D 34/6806 74/473.3 |
| 2014/0102068 A1 * | 4/2014 | Zhang | A01D 34/824 56/16.7 |
| 2015/0135670 A1 | 5/2015 | Kaskawitz et al. | |

FOREIGN PATENT DOCUMENTS

| | | |
|---|---|---|
| EP | 1 083 782 | 3/2001 |
| EP | 1 859 667 | 11/2007 |
| EP | 1 053 517 | 11/2010 |
| EP | 2 898 762 A1 | 7/2015 |
| WO | WO 98/10205 | 3/1998 |
| WO | WO 99/40499 | 8/1999 |
| WO | WO 99/63802 | 12/1999 |

OTHER PUBLICATIONS

Non-Final Office Action for U.S. Appl. No. 14/081,875 dated Mar. 27, 2015.

Canadian Office Action for Application No. 2876870 dated Jul. 6, 2016.

* cited by examiner

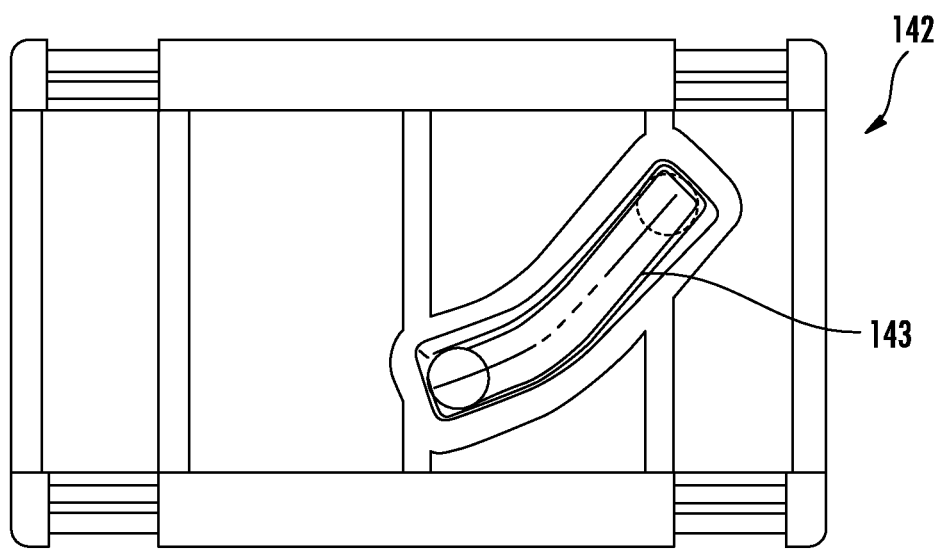
FIG. 4C
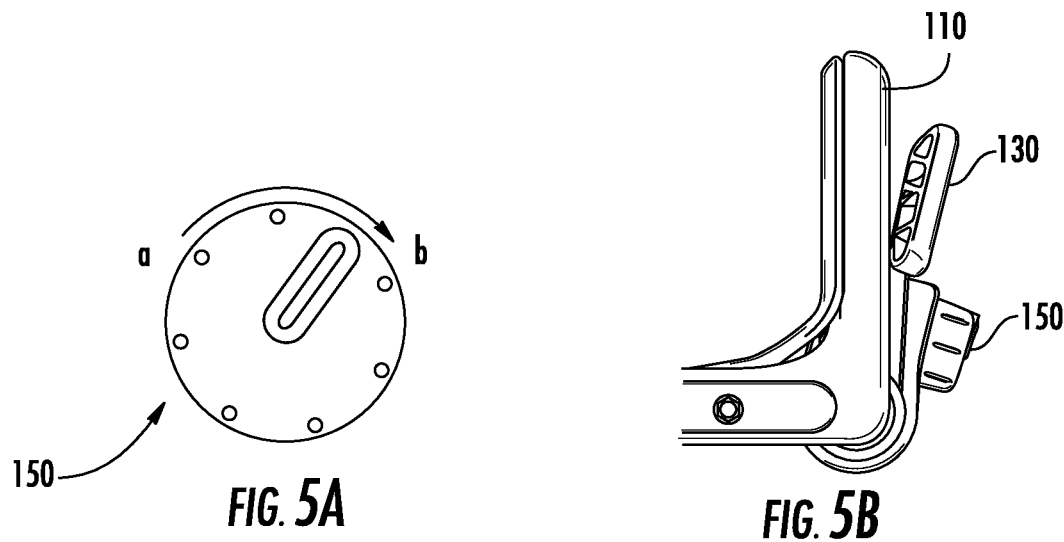
FIG. 5A
FIG. 5B

VARIABLE SPEED CONTROL SYSTEMS AND METHODS FOR WALK-BEHIND WORKING MACHINES

TECHNICAL FIELD

The subject matter disclosed herein relates generally to variable control systems for powered equipment. More particularly, the subject matter disclosed herein relates to variable speed controls and methods for walk-behind working machines, such as lawnmowers.

BACKGROUND

Many walk-behind working machines, such as lawnmowers and other similar small powered equipment, have a self-propel system that propels or drives the working machine at a selected ground speed. In such systems, a control system is typically carried on the handle to allow the operator to engage and disengage the self-propel system and to select a desired ground speed. For example, many such control systems use a pivotable ground speed control bail on the handle of the working machine. In such systems, the bail can be pivoted to engage the self-propel system, with the degree of movement of the ground speed control bail dictating the ground speed of the working machine.

In these conventional self-propel systems, however, it can be difficult to maintain the control system in a fixed position corresponding to a desired cruising speed. For example, many control systems lack a fixed position in which the operator can comfortably hold the control bail while operating the working machine at a self-propelled "cruising" speed. In view of these issues, it would be desirable for a ground speed control system to allow for comfortable operation of the working machine at a desired cruising speed.

SUMMARY

In accordance with this disclosure, variable speed control systems and methods for walk-behind working machines, such as lawnmowers and similar powered machines are provided. In one aspect, a variable speed control system for a walk-behind working machine is provided. The system can comprise a control system base, a handle, a control lever comprising a lever arm having a first end that is pivotably attached to the control system base and a second end substantially opposing the first end that comprises a grip portion, and a control connector in communication between the control lever and a machine component. The control lever can be selectively pivotable with respect to the control system base between a first angular position at which the grip portion of the control lever is spaced apart from the handle by a first angle and a second angular position at which the control lever is proximate to the handle. In addition, a control lever adjustment system can be configured to selectively adjust the first angle by which the control lever is spaced apart from the handle when the control lever is in the first angular position to adjust the total angular travel of the control lever between the first angular position and the second angular position. Based on this positioning, the control connector can be configured to control the machine component to be in one of a range of operating states corresponding to the angular position of the control lever with respect to the control system base.

In another aspect, a method for varying a speed of a walk-behind working machine is provided. The method can include, for a control lever that is selectively pivotable about a control system base between a first angular position at which a grip portion of the control lever is spaced apart from a handle by a first angle and a second angular position at which the control lever is proximate to the handle, selectively adjusting the first angle by which the control lever is spaced apart from the handle when the control lever is in the first angular position to adjust the total angular travel of the control lever between the first angular position and the second angular position. The control lever can be pivoted with respect to the control system base between the first angular position and the second angular position. In this way, pivoting the control lever between the first angular position and the second angular position controls a machine component to be in one of a range of operating states corresponding to the angular position of the control lever with respect to the control system base.

Although some of the aspects of the subject matter disclosed herein have been stated hereinabove, and which are achieved in whole or in part by the presently disclosed subject matter, other aspects will become evident as the description proceeds when taken in connection with the accompanying drawings as described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIG. 4C is a side view of a rotatable guide assembly of a variable speed control system according to an embodiment of the presently disclosed subject matter;

FIG. 5A is a top view of a control knob of a variable speed control system in an intermediate operating state according to an embodiment of the presently disclosed subject matter;

FIG. 5B is a side view of a variable speed control system when the control knob is in an intermediate state according to an embodiment of the presently disclosed subject matter;

DETAILED DESCRIPTION

Figure 1A:
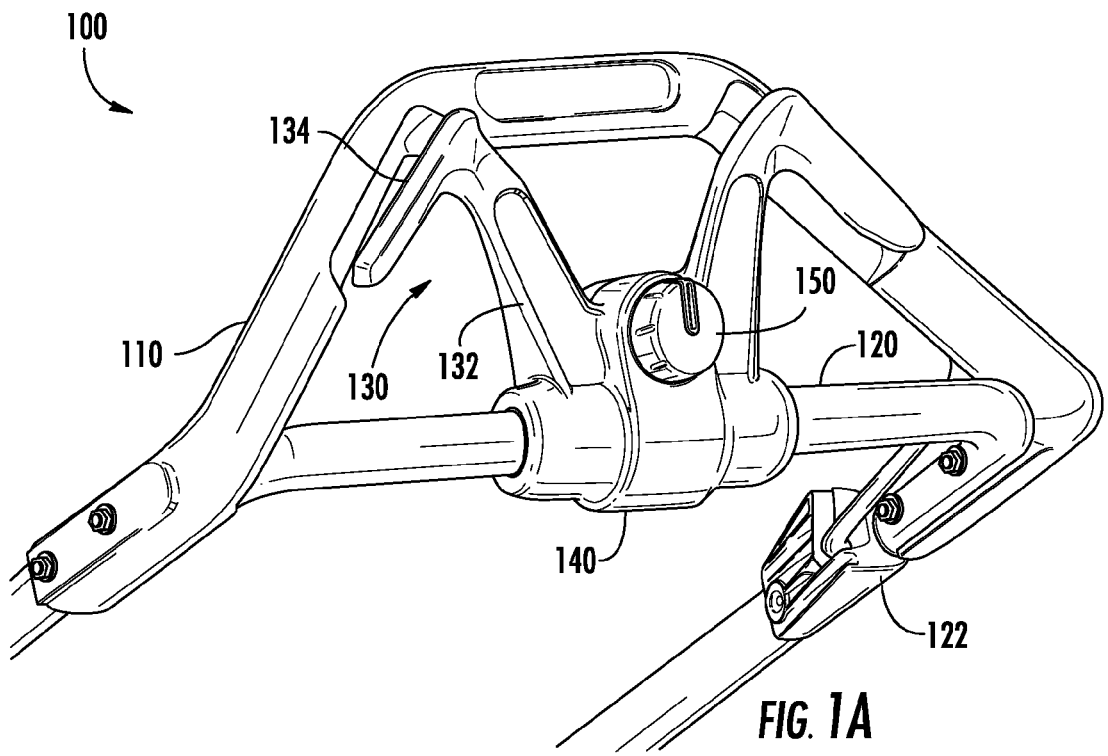
FIG. 1A is a perspective view of a variable speed control system in a first operating position according to an embodiment of the presently disclosed subject matter.
Figure 1B:
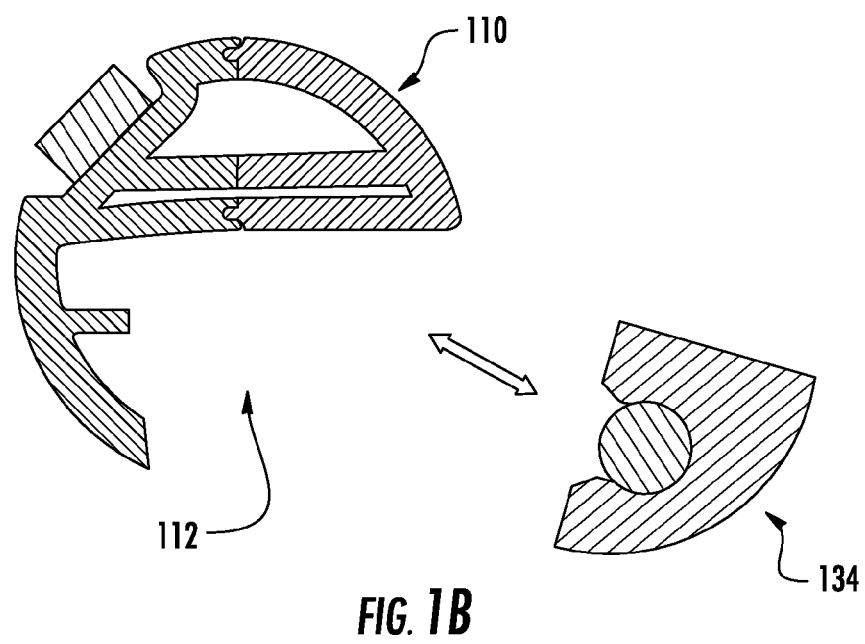
FIG. 1B is a sectional side view of a portion of a handle of the variable speed control system shown in FIG. 1A.

The present subject matter provides variable speed control systems and methods for walk-behind working machines, such as lawnmowers and similar powered machines. In one aspect, the present subject matter provides variable speed control systems and methods that can vary speed and comfortably hold a desired predetermined fixed speed.

Specifically, for instance, as shown in FIGS. 1A through 3B, a variable speed control system, generally designated 100 can comprise a handle 110 configured to be gripped by an operator to control the operation of a working machine, such as a lawnmower or other small powered machine, to which handle 110 is connected. A control system base 120 can be attached to or otherwise positioned near handle 110, and a control lever 130 can be movably attached to control system base 120. With this general configuration, control lever generally designated 130 can be moved to control operation of a machine component, such as for example a variable transmission for a self-propel system of the working machine.

Figure 2A:
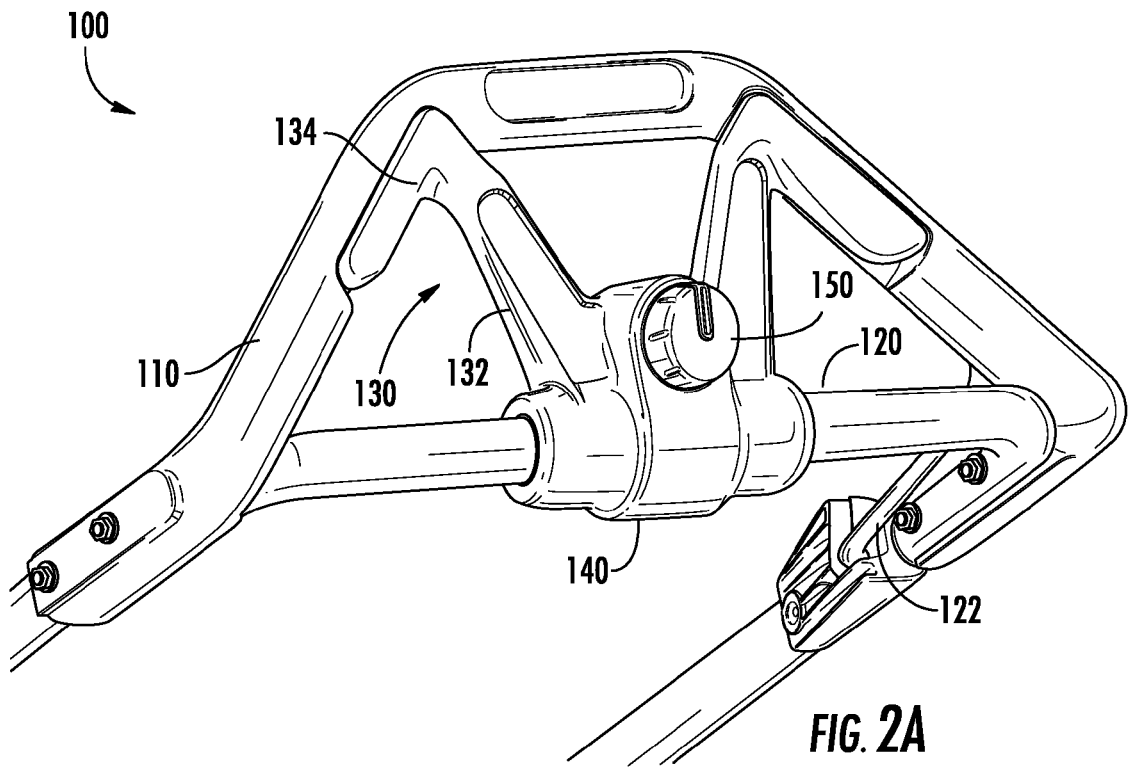
FIG. 2A is a perspective view of a variable speed control system in a second operating position according to an embodiment of the presently disclosed subject matter.
Figure 2B:
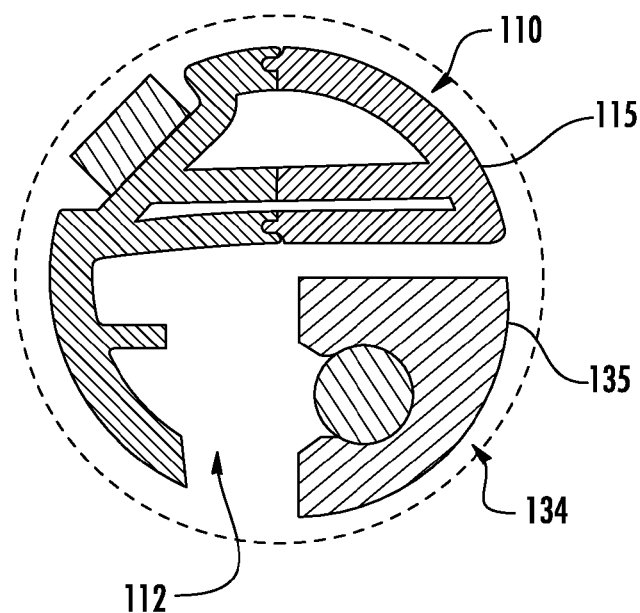
FIG. 2B is a sectional side view of a portion of a handle of the variable speed control system shown in FIG. 2A.
Figure 3A:
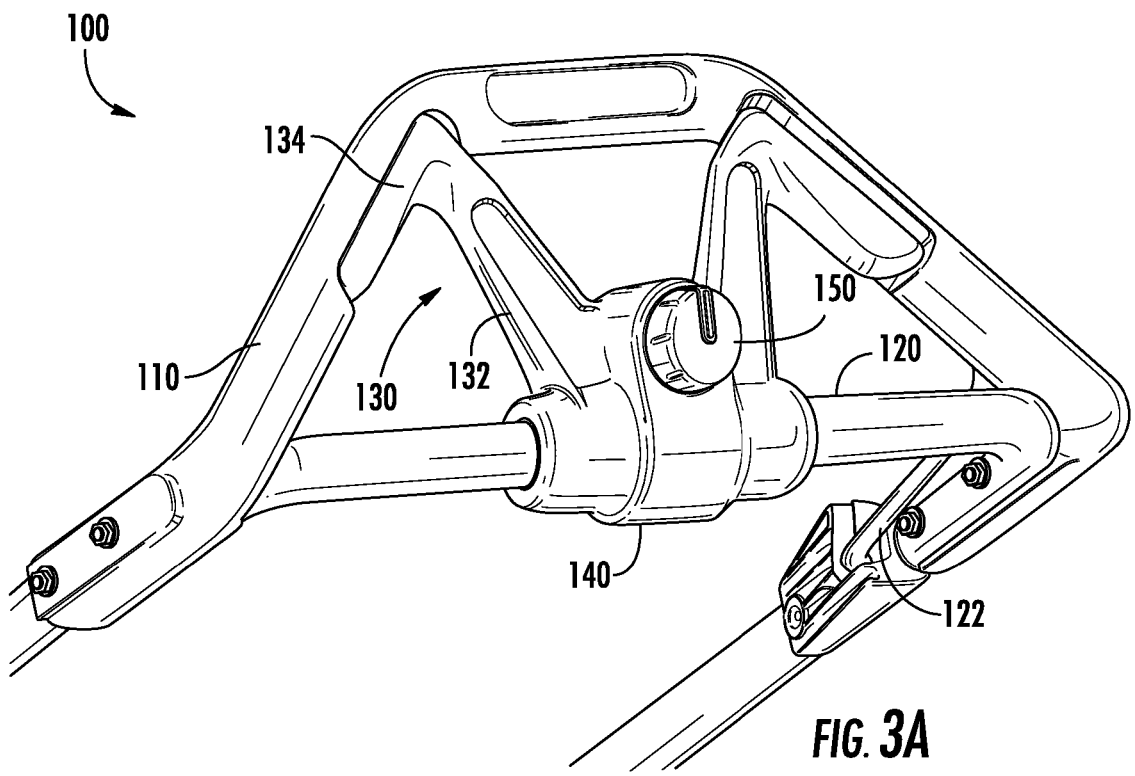
FIG. 3A is a perspective view of a variable speed control system in a third operating position according to an embodiment of the presently disclosed subject matter.

In particular, control lever 130 can comprise a lever arm 132 having a first end that is pivotably attached to control system base 120 and a second end substantially opposing the first end that comprises a grip portion 134. Specifically, for example, as shown in FIGS. 1A, 2A, and 3A, control lever 130 can have a substantially L-shaped profile, with grip portion 134 extending at a non-zero angle (e.g., between about 50 and 90 degrees) away from lever arm 132. This angular arrangement allows the operator to grab grip portion 134 in a comfortable hand position and pivot control lever 130 with respect to control system base 120.

In this regard, to control the operation of the associated machine component (e.g., a self-propel system), control lever 130 can be selectively pivoted with respect to control system base 120 between a first angular position (See, e.g., FIGS. 1A and 1B) at which grip portion 134 of control lever 130 is spaced apart from handle 110 and a second angular position (See, e.g., FIGS. 2A and 2B) at which grip portion 134 is comparatively closer to handle 110. This pivoting movement of control lever 130 can be configured to correspondingly cause changes in the operating state of the connected machine component. In particular, for example, the machine component can be configured to be in a low-speed or idle state when control lever 130 is in the first angular position and in a high-speed or cruising state when control lever 130 is moved to the second angular position. For instance, where the machine component is a self-propel system for a working machine, the first operating state can be a disengaged state (i.e., no torque applied), and the second operating state can be a selected high-speed state (i.e., torque applied to the drive system, such that the working machine is moved at a predetermined cruising speed).

To help the operator maintain control lever 130 in the second angular position, at least a portion of grip portion 134 can be designed to be positioned within a recess 112 that is formed in an edge of handle 110 when control lever 130 is in the second angular position. In the particular configuration shown in FIGS. 1A through 3B, for example, recess 112 can be designed to be large enough such that grip portion 134 can be nested substantially entirely within recess 112. In this way, pivoting control lever 130 to the second angular position can involve pivoting control lever 130 into a position in which an outer surface 135 of grip portion 134 of control lever 130 is substantially aligned with an outer surface generally designated 115 of handle 110 (e.g., surfaces substantially flush/even with one another). In this way, the combination of handle 110 and grip portion 134 can fit together such that the operator can comfortably hold control lever 130 in a substantially fixed manner at the second angular position by squeezing grip portion 134 into recess 112. With respect to the operation of a self-propel system, for example, this ability to comfortably maintain control lever 130 in the second angular position means that the operator can maintain the working machine at a cruising speed by simply gripping around the nested combination of handle 110 and grip portion 134.

Figure 3B:
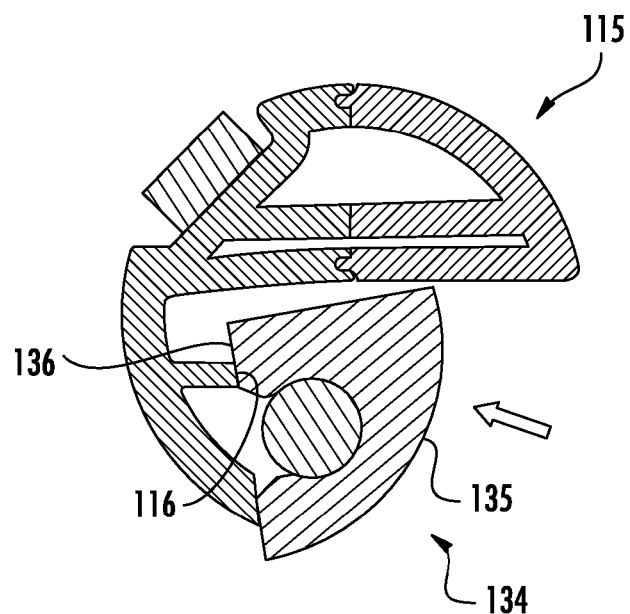
FIG. 3B is a sectional side view of a portion of a handle of the variable speed control system shown in FIG. 3A.

In addition, as shown in FIGS. 3A and 3B, recess 112 can be configured such that it is large enough that grip portion 134 can be depressed beyond the point at which outer surface 135 of grip portion 134 is substantially aligned with outer surface 115 of handle 110. In this regard, control lever 130 can be further selectively pivotable to a third angular position (See, e.g., FIGS. 3A and 3B) at which outer surface 135 of grip portion 134 of control lever 130 is depressed into recess 112 of handle 110. With control lever 130 in this third angular position, variable speed control system 100 can be configured to control the machine component to be in a third operating state. For instance, the third operating state can comprise an over-stroke state of the machine component that provides additional torque to the self-propel system to account for changing ground conditions (e.g., inclines, uneven ground surfaces). In this way, from the second angular position, if the operator desires to apply additional driving torque (e.g., to travel up a hill), grip portion 134 can be depressed into recess 112 (e.g., by using his/her thumbs to press grip portion 134 further into handle 110) to the third angular position. Depending on the configuration of recess 112, this additional over-stroke travel from the second angular position to the third angular position can be small compared to the angle of travel between the first angular position and the second angular position. To limit the extent of this over stroke, handle 110 can be configured to define or include a stop 116 at the back of recess 112 such that once a leading edge 136 of grip portion 134 encounters stop 116, control lever 130 is prevented from pivoting any farther.

Furthermore, those having skill in the art will recognize that control lever 130 can additionally be pivoted to any of a variety of intermediate angular positions to correspondingly operate the machine component in one or more partial engagement states (e.g., low- to medium-speed operating states of the self-propel system). In this way, the operator can selectively operate the machine component at states between the first and second operating states.

This movement of control lever 130 among the various angular positions discussed above can be used to control the operation of the associated machine component by connecting a control connector 122 between control lever 130 and the machine component. Specifically, for example, control connector 122 can be a Bowden-type cable in which an inner wire is movable with respect to a hollow outer cable housing to transmit a force to the machine component. In this arrangement, pivoting movement of control lever 130 can cause translation of the inner wire of control connector 122. In addition, at least a portion of control connector 122 can be contained within (e.g., routed through) control system base 120 and/or handle 110 to prevent inadvertent actuation of control connector 122. In this way, the pivoting movement of control lever 130 can be translated into changes in the operating state of the connected machine component. Those having skill in the art will recognize that any of a variety of other configurations for control connector 122 can be used to translate movement of control lever 130 into changes in the operation of the connected machine component. For example, control connector 122 can be a wired or wireless electrical signal transmitter that enables communication between control lever 130 and the machine component.

Regardless of the particular mechanism by which rotation of control lever 130 is translated into changes in the operating state of the connected machine component, this control arrangement can be configured such that the greater the distance that control connector 122 is displaced, the greater the force that is transmitted to the machine component. Accordingly, the magnitude of the output of the machine component corresponding to each operating state (e.g., the speed of the self-propel system) can be controlled by correspondingly controlling the magnitude of the displacement of control connector 122, which can in turn be controlled by correspondingly controlling the angular travel of control lever 130. As a result, greater outputs can be achieved by greater total angular movement of control lever 130.

With this relationship in mind, variable speed control system 100 can be configured to enable the operator to selectively control the magnitude of the output of the machine component that corresponds to each operating state by modifying the length of the total angular travel of control lever 130. Because the second angular position of control lever 130 is defined above by the proximity of control lever 130 to handle 110 (e.g., See FIGS. 2A and 2B), such modification of the length of total angular travel of control lever 130 can be most easily achieved by changing the location of the first angular position of control lever 130 relative to handle 110 (i.e., a base starting position).

Figure 4A:
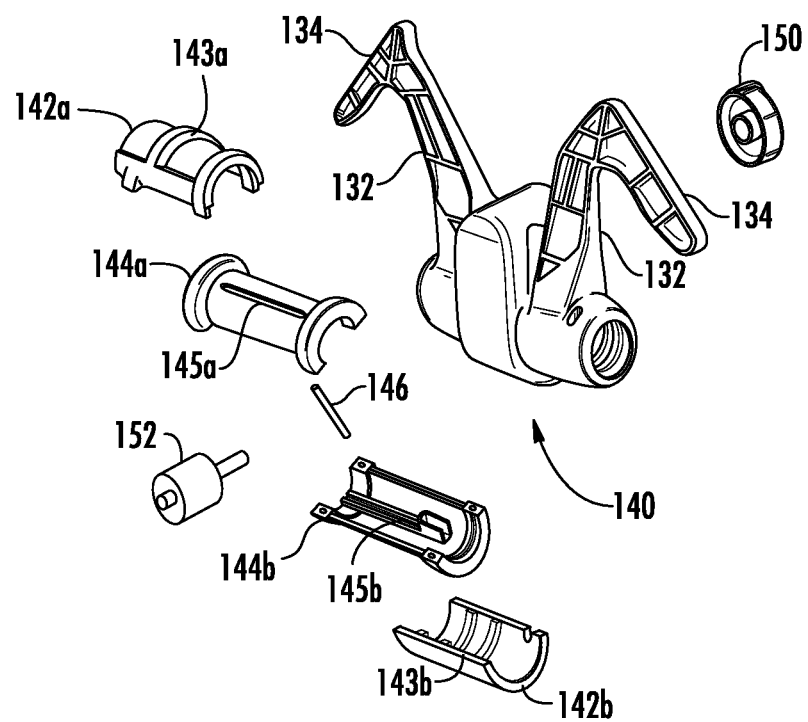
FIG. 4A is an exploded perspective view of a variable speed control system according to an embodiment of the presently disclosed subject matter.
Figure 4B:
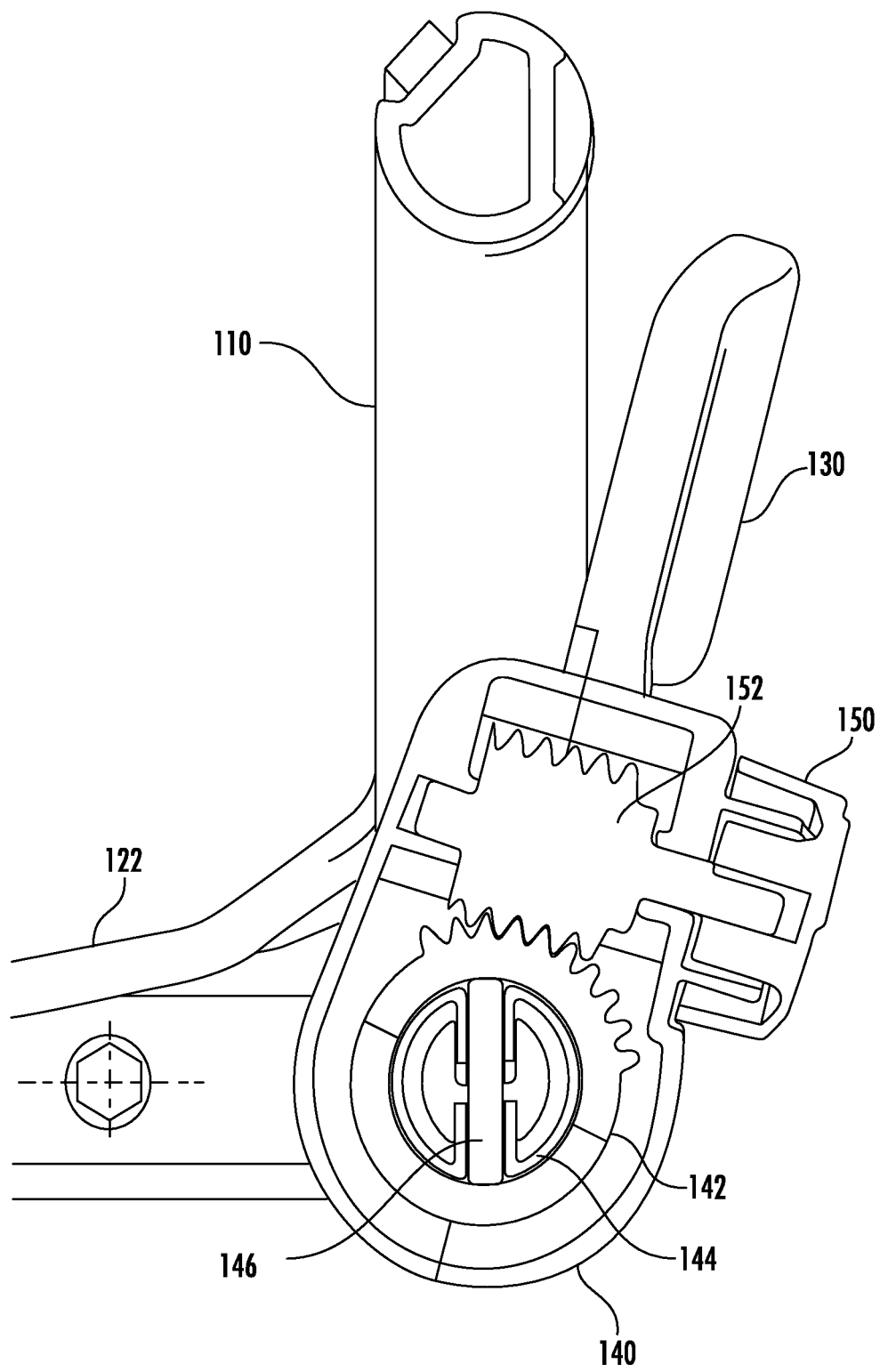
FIG. 4B is a side cutaway view of a variable speed control system according to an embodiment of the presently disclosed subject matter.

In this regard, variable speed control system 100 can be configured such that the first angular position of control lever 130 is selectively adjustable. Specifically, as shown in FIGS. 4A through 4C, variable speed control system 100 can comprise a control lever adjustment system, generally designated 140, that is configured to adjust the first angular position of control lever 130. Control lever adjustment system 140 can include a guide assembly 142 that is rotatable with respect to control system base 120 and that is connected to control connector 122 to effect changes in the operating state of the connected machine component. In particular, guide assembly 142 can comprise a groove 143 that is configured to receive a control pin 146 therein, control pin 146 being connected to control connector 122. In particular, for example, as shown in FIG. 4A, guide assembly 142 can comprise a first guide portion 142a defining a first groove 143a and a second guide portion 142b defining a second groove 143b that are configured to be connected together to form a substantially cylindrical sleeve that surrounds and engages control pin 146.

To constrain the movement of control pin 146 to be in a predictable and defined path, a bracket 144 can be positioned in a substantially fixed orientation with respect to control system base 120 and configured to guide control pin 146 to move in a substantially linear path along a slot 145 formed in bracket 144 (e.g., in a substantially axial direction with respect to bracket 144 and control system base 120). In particular, for example, as shown in FIG. 4A, bracket 144 can comprise a first bracket portion 144a having a first slot 145a formed therein and a second bracket portion 144b having a second slot 145b formed therein, first bracket portion 144a and second bracket portion 144b being configured to be connected together to form a substantially cylindrical shell within guide assembly 142. Thus, as shown in FIG. 4B, control pin 146 can be constrained by bracket 144, which can be nested within guide assembly 142.

In this arrangement, rotation of guide assembly 142 can cause a linear displacement of control pin 146 to thereby cause actuation of control connector 122. Specifically, as shown in FIG. 4C, whereas slot 145 in bracket 144 can be configured to be substantially linear to guide the movement of control pin 146, groove 143 in guide assembly 142 can have an arcuate shape. In this way, rotation of guide assembly 142 exerts a force on control pin 146 that would tend to rotate control pin 146 about a central longitudinal axis of guide assembly 142. Because control pin 146 is restrained by slot 145 to only be movable in an axial direction with respect to guide assembly 142, however, the force exerted on control pin 146 causes control pin 146 to slide axially along groove 143. Accordingly, actuation of control connector 122 can be controlled by controlling the rotation of guide assembly 142.

In addition, guide assembly 142 can be coupled to control lever 130 such that pivoting movement of control lever 130 causes rotation of guide assembly 142. In particular, as shown in FIG. 4B, guide assembly 142 can be coupled to control lever 130 by a control knob 150 connected to a worm gear 152 that is carried by control lever 130. In this arrangement, rotation of control knob 150 can cause rotation of worm gear 152 with respect to control lever 130. This rotation of worm gear 152 can exert a force on complementary gear teeth provided on guide assembly 142, which can cause control lever 130 to pivot with respect to guide assembly 142 and control system base 120. In this way, adjustments in the position of control knob 150 can result in modifications to the base position (i.e., the first angular position) of control lever 130 with respect to control system base 120. As a result, the operator can selectively move control knob 150 to set the first angular position of control lever 130 with respect to control system base 120.

As discussed above, because this setting establishes the total available angular travel through which control lever 130 can be pivoted, setting this base position effectively controls the range of operating states of the machine component. In other words, where the machine component is a self-propel system, for example, increasing the total angular travel through which control lever 130 can be pivoted effectively increases the cruising speed when control lever 130 is pivoted to the second angular position proximate to handle 110 (and the over-stroke speed when control lever 130 is depressed into handle 110 to the third angular position).

Figure 6A:
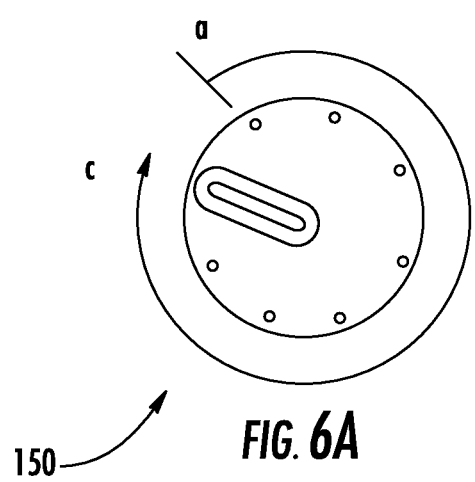
FIG. 6A is a top view of a control knob of a variable speed control system in a high operating state according to an embodiment of the presently disclosed subject matter.
Figure 6B:
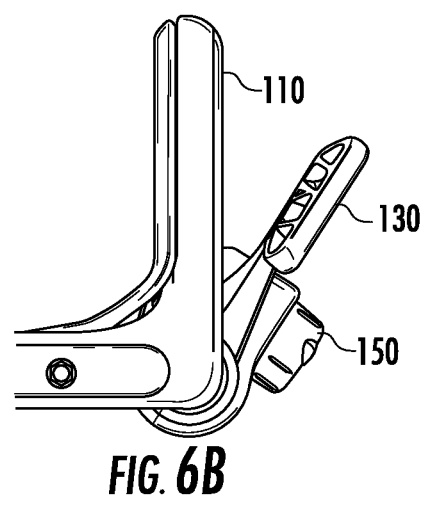
FIG. 6B is a side view of a variable speed control system when the control knob is in a high state according to an embodiment of the presently disclosed subject matter.

Specifically, for example, FIGS. 5A and 5B illustrate adjustment of control knob 150 from a minimum base state a to an increased base state b, which moves control lever 130 to a corresponding base angular position with respect to handle 110 (e.g., about 18°). In comparison, FIGS. 6A and 6B illustrate adjustment of control knob 150 from minimum base state a to a high base state c, which moves control lever 130 to a correspondingly higher base angular position with respect to handle 110 (e.g., about 36°). Of course, those having skill in the art will recognize that control knob 150 can be turned to any of a variety of intermediate positions corresponding to a variety of angular positions of control lever 130. In this way, the operator of variable speed control system 100 can move control knob 150 to establish the maximum operating state (e.g., set the cruising speed) of the machine component to be any desired state within the operating limits of the machine component. The adjustability gives the operator precise control over the operation of the machine component.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A variable speed control system for a walk-behind working machine, comprising:
   a control system base;
   a handle;
   a control lever comprising a lever arm having a first end that is pivotably attached to the control system base and a second end substantially opposing the first end that comprises a grip portion, the control lever being selectively pivotable with respect to the control system base between an adjustable first angular position at which the grip portion of the control lever is spaced apart from the handle by a first angle and a second angular position at which the control lever is proximate to the handle, the handle comprising a stop that prevents the control lever from pivoting beyond the second angular position;
   a control connector in communication between the control lever and a machine component, wherein the control connector is configured to control the machine component to be in one of a range of operating states corresponding to the angular position of the control lever with respect to the control system base; and
   a control lever adjustment system configured to selectively adjust the first angle by which the control lever is spaced apart from the handle when the control lever is in the first angular position to adjust a total angular travel of the control lever between the first angular position and the second angular position;
   wherein the control lever adjustment system comprises a control knob that is rotatable with respect to the control lever, wherein rotation of the control knob causes adjustment of the first angle by which the control lever is spaced apart from the handle when the control lever is in the first angular position.

2. The variable speed control system of claim 1, wherein the range of operating states corresponding to the angular position of the control lever comprises:
   a disengaged state of the machine component when the control lever is in the first angular position; and
   an engaged state of the machine component when the control lever is in the second angular position, a magnitude of an output of the machine component when in the engaged state being dependent on the total angular travel of the control lever between the first angular position and the second angular position.

3. The variable speed control system of claim 2, wherein the machine component comprises a variable transmission for a self-propel system of the working machine; and
   wherein the engaged state comprises operation of the self-propel system at a cruising speed determined by the total angular travel of the control lever between the first angular position and the second angular position.

4. The variable speed control system of claim 1, wherein an outer surface of the grip portion of the control lever is substantially aligned with an outer surface of the handle when the control lever is in the second angular position.

5. The variable speed control system of claim 1, wherein the control knob is coupled to the control lever.

6. The variable speed control system of claim 1, wherein the control lever adjustment system comprises a guide assembly connected to the control connector;
   wherein the control lever is selectively movable with respect to the guide assembly to adjust the first angle by which the control lever is spaced apart from the handle when the control lever is in the first angular position; and
   wherein movement of the control lever relative to the control system base causes movement of the guide assembly to actuate the control connector.

7. The variable speed control system of claim 6, wherein the guide assembly comprises a groove;
   wherein the control connector comprises a pin movable within the groove; and
   wherein movement of the guide assembly causes movement of the pin, which actuates the control connector to cause the machine component to change among the range of operating states.

8. The variable speed control system of claim 7, wherein the control connector comprises a bracket positioned in a substantially fixed orientation with respect to the control system base, the bracket comprising a slot configured to constrain the movement of the pin to be in a substantially linear path.

9. The variable speed control system of claim 6, wherein the control lever adjustment system comprises a worm gear connected to the control knob and engaged with the guide assembly;
   wherein rotation of the control knob with respect to the control lever comprises actuating the worm gear to adjust the first angle by which the control lever is spaced apart from the handle when the control lever is in the first angular position.

10. A method for varying a speed of a walk-behind working machine, the walk-behind machine comprising a control lever that is selectively pivotable about a control system base between an adjustable first angular position at which a grip portion of the control lever is spaced apart from a handle by a first angle and a second angular position at which the control lever is proximate to the handle, the handle comprising a stop that prevents the control lever from pivoting beyond the second angular position, the method comprising:
    selectively adjusting the first angle by which the control lever is spaced apart from the handle when the control lever is in the first angular position by rotating a control knob with respect to the control lever to adjust a total angular travel of the control lever between the first angular position and the second angular position; and
    pivoting the control lever with respect to the control system base between the first angular position and the second angular position;
    wherein pivoting the control lever between the first angular position and the second angular position controls a machine component to be in one of a range of operating states corresponding to the angular position of the control lever with respect to the control system base.

11. The method of claim 10, wherein pivoting the control lever to control the machine component comprises actuating a control connector in communication between the control lever and the machine component.

12. The method of claim 11, wherein selectively adjusting the first angle by which the control lever is spaced apart from the handle when the control lever is in the first angular position comprises selectively moving the control lever with respect to a guide assembly connected to the control connector; and wherein pivoting the control lever with respect to the control system base comprises moving the control lever relative to the control system base to cause movement of the guide assembly to actuate the control connector.

13. The method of claim 12, wherein moving the control lever relative to the control system base to cause movement of the guide assembly to actuate the control connector comprises moving a pin within a groove in the guide assembly, wherein movement of the pin causes the machine component to change among the range of operating states.

14. The method of claim 13, wherein moving the pin within the groove in the guide assembly comprises constraining the movement of the pin to be in a substantially linear path.

15. The method of claim 12, wherein selectively moving the control lever with respect to the guide assembly comprises actuating a worm gear connected to the control knob and engaged with the guide assembly to adjust the first angle by which the control lever is spaced apart from the handle when the control lever is in the first angular position.

16. The method of claim 10, wherein pivoting the control lever to the first angular position comprises controlling the machine component to be in a disengaged state; and wherein pivoting the control lever to the second angular position comprises controlling the machine component to be in an engaged state, a magnitude of an output of the machine component when in the engaged state being dependent on the total angular travel of the control lever between the first angular position and the second angular position.

17. The method of claim 16, wherein the machine component comprises a variable transmission for a self-propel system of the working machine; and wherein the engaged state comprises operation of the self-propel system at a predetermined cruising speed.

18. The method of claim 10, wherein pivoting the control lever to the second angular position comprises pivoting the control lever to a position at which an outer surface of the grip portion of the control lever is substantially aligned with an outer surface of the handle when the control lever is in the second position.

* * * * *